(12) United States Patent
Lee et al.

(10) Patent No.: US 10,266,106 B2
(45) Date of Patent: Apr. 23, 2019

(54) VEHICULAR HEADLAMP DRIVING CONTROL DEVICE

(71) Applicant: GM GLOBAL TECHNOLOGY OPERATIONS LLC, Detroit, MI (US)

(72) Inventors: Kyuchul Lee, Seoul (KR); Seolhui Kim, Incheon (KR); Donghoon Yum, Incheon (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/063,012

(22) PCT Filed: Dec. 14, 2016

(86) PCT No.: PCT/KR2016/014664
§ 371 (c)(1),
(2) Date: Jun. 15, 2018

(87) PCT Pub. No.: WO2017/105086
PCT Pub. Date: Jun. 22, 2017

(65) Prior Publication Data
US 2019/0001867 A1    Jan. 3, 2019

(30) Foreign Application Priority Data

Dec. 16, 2015 (KR) ........................ 10-2015-0179977

(51) Int. Cl.
*B60Q 1/02* (2006.01)
*B60Q 1/115* (2006.01)
*B60Q 1/04* (2006.01)

(52) U.S. Cl.
CPC ............... *B60Q 1/115* (2013.01); *B60Q 1/04* (2013.01); *B60Q 2300/112* (2013.01); *B60Q 2300/12* (2013.01)

(58) Field of Classification Search
CPC ...................................................... B60Q 1/04
(Continued)

(56) References Cited

U.S. PATENT DOCUMENTS 7,719,197 B2 * 5/2010 Martin ................. B60Q 1/1423
315/82
2016/0075273 A1 * 3/2016 Stuehmer ................ B60Q 1/12
315/82
(Continued)

FOREIGN PATENT DOCUMENTS

JP    2002193027 A    7/2002
JP    2010111146 A    5/2010
(Continued)

*Primary Examiner* — Thuy V Tran
(74) *Attorney, Agent, or Firm* — Reising Ethington, P.C.

(57) ABSTRACT

A vehicular headlamp driving control device is provided, wherein the vehicular headlamp driving control device comprises: an AFL function on/off check unit; a headlamp driving controller that reads an AFL function execution initiation message and then controls operations of a left/right driving actuator, an up/down driving actuator, and a beam pattern changing actuator, which have been connected to the headlamp, so as to correspond to a sensing value from a sensor; and an AFL function detailed adjustment controller configured such that the AFL function can be distinguished as belonging to an AFL detailed level of an upper level, a middle level, or a lower level according to AFL detailed distinction particulars, which have been preset in AFL function detailed setting particulars, and controlled accordingly.

3 Claims, 4 Drawing Sheets

(58) Field of Classification Search
USPC .......................................................... 315/82
See application file for complete search history.

(56) References Cited

U.S. PATENT DOCUMENTS

| | | | |
|---|---|---|---|
| 2016/0082877 A1* | 3/2016 | Oberhammer | B60Q 1/0023 348/46 |
| 2016/0159272 A1* | 6/2016 | Kataike | B60Q 1/12 315/79 |
| 2017/0198877 A1* | 7/2017 | Suwa | F21S 41/322 |

FOREIGN PATENT DOCUMENTS

| | | |
|---|---|---|
| KR | 100798143 B1 | 1/2008 |
| KR | 101210575 B1 | 12/2012 |
| KR | 20130136107 A | 12/2013 |
| KR | 101397612 B1 | 5/2014 |
| KR | 20150012775 A | 2/2015 |
| KR | 20150064327 A | 6/2015 |

* cited by examiner

[FIG. 1] PRIOR ART
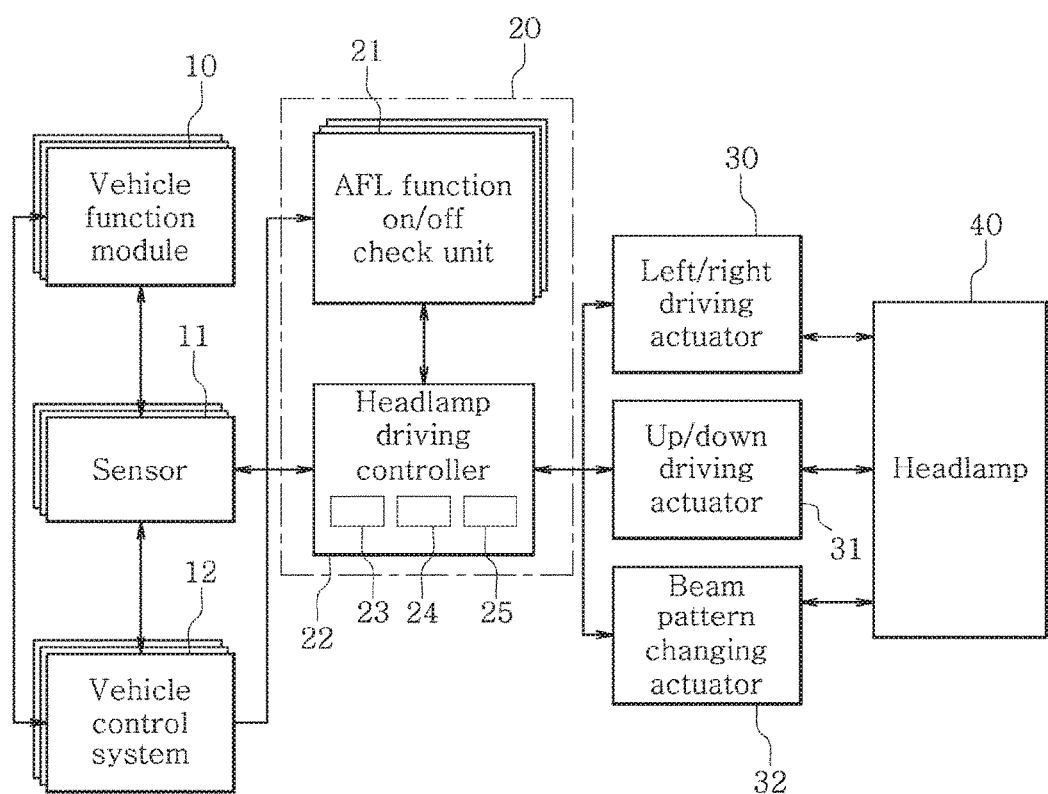

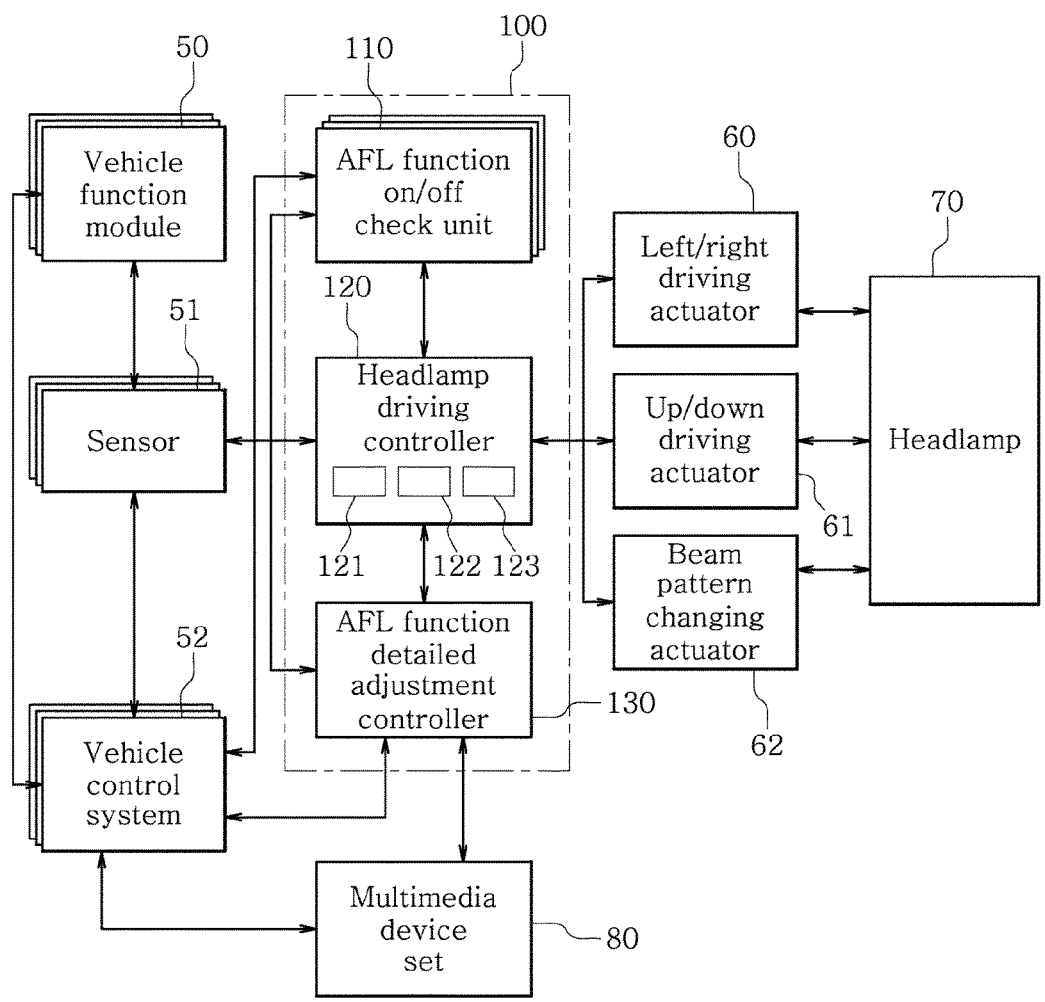
[FIG. 2]

【FIG. 3】
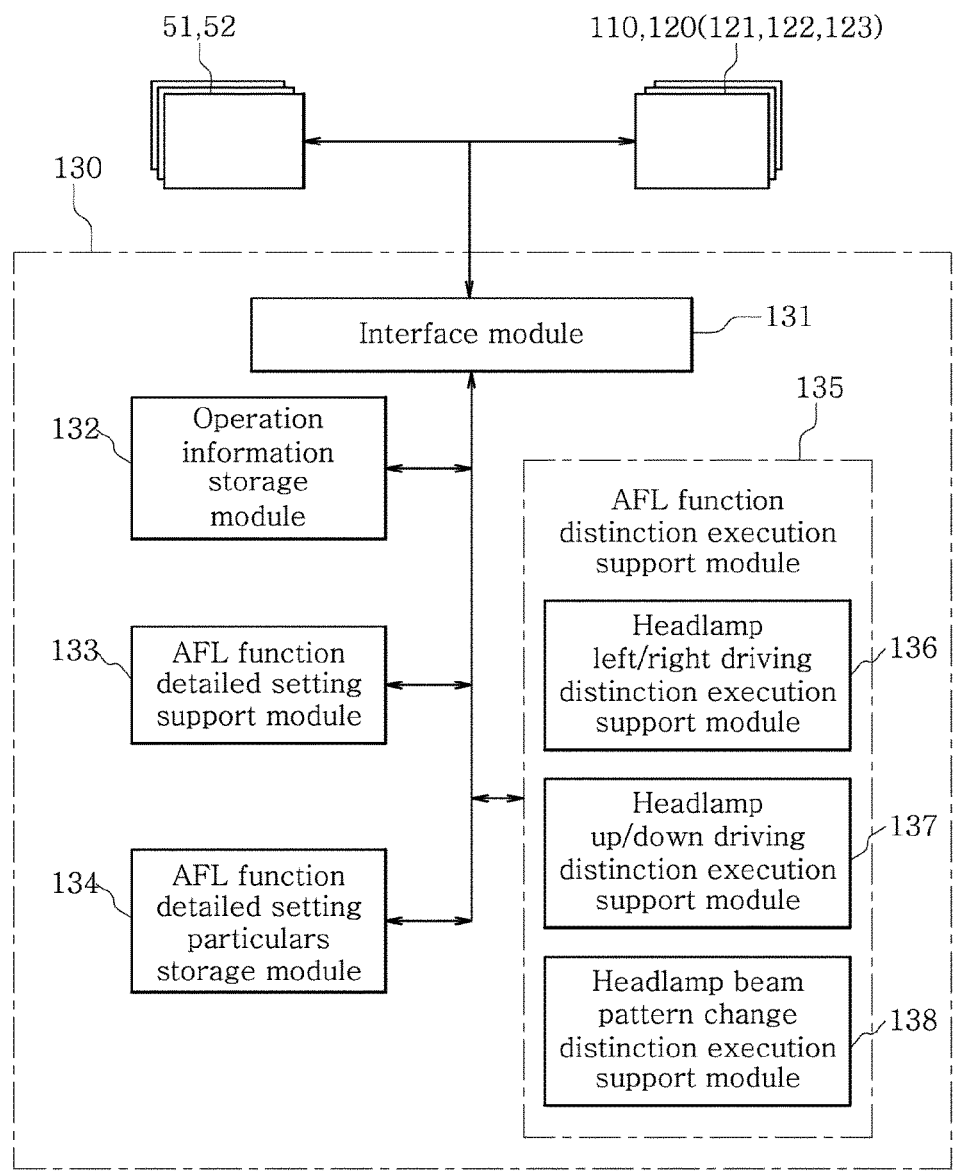

【FIG. 4】
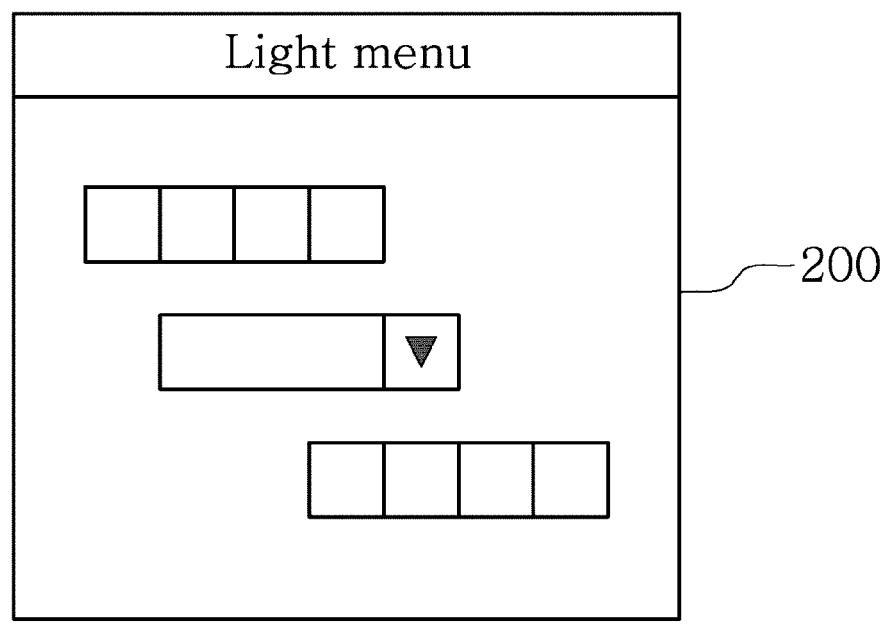

VEHICULAR HEADLAMP DRIVING CONTROL DEVICE

The present disclosure relates to a vehicular headlamp driving control device, and more particularly, to a vehicular headlamp driving control device that allows a driver to execute an adaptive forward lighting (AFL) function at high, medium, low, etc. outputs (i.e., upper level, middle level, lower level, etc.) classified according to the driver's characteristics (e.g., age, driving attitude, gender, eyesight, etc.), thereby guiding toward more effective enjoyment of vehicle performance improvement benefits from further details of the AFL function on the side of the driver and the vehicle supplier.

Recently, with the dramatic development of technology related to vehicles, vehicular headlamp driving control devices that execute a so-called adaptive forward lighting (AFL) function>have been widely developed/spread to automatically control the up/down/left/right driving and beam pattern changes of the headlamp, etc. based on speed changes of the vehicle, angle changes of the steering and front/rear inclination changes of the vehicle, etc.

For example, Korean Patent Publication No. 10-1210575 (titled apparatus and method for adjusting headlamp) (issued Dec. 11, 2012), Korean Patent Publication No. 10-1397612 (titled apparatus and method for controlling headlamp) (issued May 27, 2014), Korean Patent Application Publication No. 10-2015-12775 (titled apparatus and method for controlling headlamp of vehicle) (published Feb. 4, 2015), etc. disclose the detailed configuration of conventional vehicular headlamp driving control devices in more detail.

As shown in FIG. 1, the conventional vehicular headlamp driving control device 20 adopts a systematically combined configuration of an AFL function on/off check unit 21, a headlamp driving controller 22, etc.

In this case, the headlamp driving controller 22 adopts a systematically combined configuration of a headlamp left/right driving control module 23, a headlamp up/down driving control module 24 and a headlamp beam pattern change control module 25, etc.

In this instance, upon operation of a headlamp 40, the AFL function on/off check unit 21 communicates with a vehicle control system 12 and reads a drivers selection whether to turn on/off an AFL function, and then when the AFL function is selected as ON, communicates with the headlamp driving controller 22 and induces the operation control of a left/right driving actuator 30, an up/down driving actuator 31, a beam pattern changing actuator 32, etc. connected to the headlamp 40, to enable, through this, automatic control of the up/down/left/right driving of the headlamp 40 and beam pattern changes of the headlamp 40 etc. based on speed changes of the vehicle, angle changes of the steering, front/rear inclination changes of the vehicle, etc., thereby supporting the driver to normally enjoy a series of AFL functions without any particular problem on the driver's side.

In this case, when the AFL function is selected as ON, the AFL function on/off check unit 21 performs a series of message generation routines to generate an AFL function execution initiation message, and then transmits the generated AFL function execution initiation message to the headlamp driving controller 22, to induce the headlamp driving controller 22 to normally perform a procedure for controlling the left/right driving actuator 30, a procedure for controlling the up/down driving actuator 31 and a procedure for controlling beam pattern changing actuator 32, etc. necessary for the headlamp driving controller 22 without any particular problem.

Additionally, the headlamp driving controller 22 working together with the AFL function on/off check unit 21 communicates with a sensor 11 (e.g., a steering wheel angle sensor, a vehicle speed sensor, an accelerator pedal sensor, a brake sensor, a vehicle front end leveling sensor, a vehicle rear end leveling sensor, etc.) connected to various vehicle function modules 10 (e.g., a handle, an accelerator pedal, a vehicle left/right driving function element, a vehicle leveling function element, a shutter function element, etc.), and when the AFL function execution initiation message is transmitted from the AFL function on/off check unit 21, controls the operation of the left/right driving actuator 30, the up/down driving actuator 31 and the beam pattern changing actuator 32, etc. connected to the headlamp 40 with a preset single fixed value corresponding to a sensing value from the sensor 11, to support the automatic control of the up/down/left/right driving of the headlamp 40 and beam pattern changes of the headlamp 40, etc. based on speed changes of the vehicle, angle changes of the steering and front/rear inclination changes of the vehicle, etc.

In this instance, the headlamp left/right driving control module 23 belonging to the headlamp driving controller 22 communicates with the sensor 11 (e.g., a steering wheel angle sensor, a vehicle speed sensor, an accelerator pedal sensor, a brake sensor, a vehicle front end leveling sensor, a vehicle rear end leveling sensor, etc.) connected to the vehicle function module 10 (e.g., a handle, an accelerator pedal, a vehicle left/right driving function element, a vehicle leveling function element, a shutter function element, etc.), and when the AFL function execution initiation message is transmitted from the AFL function on/off check unit 21, controls the operation of the left/right driving actuator 30 connected to the headlamp 40 based on a single fixed value corresponding to a sensing value from the sensor 11, to support the automatic control of the left/right driving of the headlamp 40 based on speed changes of the vehicle, angle changes of the steering and front/rear inclination changes of the vehicle, etc.

Additionally, the headlamp up/down driving control module 24 belonging to the headlamp driving controller 22 communicates with the sensor 11 (e.g., a steering wheel angle sensor, a vehicle speed sensor, an accelerator pedal sensor, a brake sensor, a vehicle front end leveling sensor, a vehicle rear end leveling sensor, etc.) connected to the vehicle function module 10 (e.g., a handle, an accelerator pedal, a vehicle left/right driving function element, a vehicle leveling function element, a shutter function element, etc.), and when the AFL function execution initiation message is transmitted from the AFL function on/off check unit 21, controls the operation of the up/down driving actuator 31 connected to the headlamp 40 with a preset single fixed value corresponding to a sensing value from the sensor 11, to support the automatic control of the up/down driving of the headlamp 40 based on speed changes of the vehicle, angle changes of the steering and front/rear inclination changes of the vehicle etc.

Further, the headlamp beam pattern change control module 25 belonging to the headlamp driving controller 22 communicates with the sensor 11 (e.g., a steering wheel angle sensor, a vehicle speed sensor, an accelerator pedal sensor, a brake sensor, a vehicle front end leveling sensor, a vehicle rear end leveling sensor etc.) connected to the vehicle function module 10 (e.g., a handle, an accelerator pedal, a vehicle left/right driving function element, a vehicle leveling function element, a shutter function element, etc.), and when the AFL function execution initiation message is transmitted from the AFL function on/off check unit 21, controls the operation of the beam pattern changing actuator 32 connected to the headlamp 40 with a preset single fixed value corresponding to a sensing value from the sensor 11, to support the automatic control of beam pattern changes of the headlamp 40 based on speed changes of the vehicle, angle changes of the steering and front/rear inclination changes of the vehicle, etc.

Meanwhile, under this conventional system, as described above, upon operation of the headlamp 40, the AFL function on/off check unit 21 communicates with the vehicle control system 12 and reads the driver's selection whether to turn on/off the AFL function, and then when the AFL function is selected as ON, communicates with the headlamp driving controller 22 and implements a series of AFL functions, and the headlamp driving controller 22 working together with the AFL function on/off check unit 21 receives/reads the AFL function execution initiation message from the AFL function on/off check unit 21 and then controls the operation of the left/right driving actuator 30, the up/down driving actuator 31 and the beam pattern changing actuator 32, etc. with a preset single fixed value corresponding to a sensing value from the sensor 11, and in this case, the driver only can extremely select whether to turn on/off the AFL function, and has to put up with the problem that the driver cannot execute the AFL function at high, medium, low, etc. outputs classified according to the driver's characteristics (e.g., age, driving attitude, gender, eyesight, etc.).

In this situation, for example, when the driver is in mid-fifties and somewhat sensitive to a sharp change of the headlamp 40, and accordingly the driver has a desire that AFL function be implemented, but its level be middle, the driver turns off the AFL function, or despite the inconvenience the driver has to put up with, the driver cannot help making a very extreme selection to turn on the AFL function with the single fixed value.

As another example, when the driver has astigmatism and is somewhat sensitive to a sharp change of the headlamp 40, and accordingly the driver has a desire that AFL function be implemented, but its level be low, the driver turns off the AFL function, or despite the inconvenience the driver has to put up with, the driver cannot help making a very extreme selection to turn on the AFL function with the single fixed value.

SUMMARY

Therefore, in an embodiment, the present disclosure is aimed at, under the communication infrastructure of a vehicle control system, an adaptive forward lighting (AFL) function on/off check unit and a headlamp driving controller, etc., additionally placing <a computation module to, at the time of operation of the headlamp driving controller, read pre-stored AFL function detailed setting particulars (e.g., <setting particulars to execute the left/right driving of the headlamp on middle level>, <setting particulars to execute the up/down driving of the headlamp on lower level>, <setting particulars to execute the beam pattern change of the headlamp on middle level>etc.), and then communicate with the headlamp driving controller, and support the operation control of a left/right driving actuator, an up/down driving actuator, a beam pattern changing actuator, etc. on each AFL detailed level (e.g., upper level, middle level, lower level, etc.) classified according to AFL detailed distinction particulars preset in the AFL function detailed setting particulars>, and through this, allowing the driver to execute the AFL function at high, medium and low etc. outputs (i.e., upper level, middle level, lower level, etc.) classified according to the driver's characteristics (e.g., age, driving attitude, gender, eyesight, etc.), thereby guiding toward more effective enjoyment of vehicle performance improvement benefits from further details of the AFL function on the side of the driver and the vehicle supplier.

Other objects of the present disclosure will be apparent from the following detailed description and the accompanying drawings.

To achieve the above-described object, in an embodiment, the present disclosure discloses a vehicular headlamp driving control device including an adaptive forward lighting (AFL) function on/off check unit that upon operation of a headlamp, communicates with a vehicle control system and reads a selection whether to turn on/off an AFL function, and when the AFL function is selected as ON, generates an AFL function execution initiation message; a headlamp driving controller that communicates with a sensor connected to a vehicle function module and the AFL function on/off check unit, reads the AFL function execution initiation message, and then controls operation of a left/right driving actuator, an up/down driving actuator and a beam pattern changing actuator connected to the headlamp so as to correspond to a sensing value from the sensor; and an AFL function detailed adjustment controller that at the time of operation of the headlamp driving controller, reads pre-stored AFL function detailed setting particulars, and then communicates with the headlamp driving controller, and controls the operation of the left/right driving actuator, the up/down driving actuator and the beam pattern changing actuator on an AFL detailed level of an upper level, a middle level, or a lower level classified according to AFL detailed distinction particulars preset in the AFL function detailed setting particulars.

Under the communication infrastructure of the vehicle control system, the adaptive forward lighting (AFL) function on/off check unit and the headlamp driving controller etc., the present disclosure additionally places the computation module to, at the time of operation of the headlamp driving controller, read the pre-stored AFL function detailed setting particulars (e.g., <setting particulars to execute the left/right driving of the headlamp on middle level>, <setting particulars to execute the up/down driving of the headlamp on lower level>, <setting particulars to execute the beam pattern change of the headlamp on middle level>, etc.), and then communicate with the headlamp driving controller, and support the operation control of the left/right driving actuator, the up/down driving actuator and the beam pattern changing actuator, etc. on each AFL detailed level (e.g., upper level, middle level, lower level, etc.) classified according to the AFL detailed distinction particulars preset in the AFL function detailed setting particulars, and in the implementation environment of the present disclosure, the driver may execute the AFL function at high, medium, low, etc. outputs (i.e., upper level, middle level, lower level, etc.) classified according to the driver's characteristics (e.g., age, driving attitude, gender, eyesight, etc.), and eventually, the driver and the vehicle supplier may enjoy vehicle performance improvement benefits from further details of the AFL function more effectively.

BRIEF DESCRIPTION OF THE DRAWINGS

FIG. 1 is an exemplified diagram conceptually showing a conventional vehicular headlamp driving control device.

FIG. 2 is an exemplified diagram conceptually showing a vehicular headlamp driving control device according to an embodiment of the present disclosure.

FIG. 3 is an exemplified diagram conceptually showing the detailed configuration of an adaptive forward lighting (AFL) function detailed adjustment controller according to an embodiment of the present disclosure.

FIG. 4 is an exemplified diagram conceptually showing the output pattern of an AFL function detail setting guide menu according to an embodiment of the present disclosure.

DETAILED DESCRIPTION

Hereinafter, a vehicular headlamp driving control device according to an embodiment of the present disclosure will be described in detail as below with reference to the accompanying drawings.

As shown in FIG. 2, the vehicular headlamp driving control device 100 according to an embodiment of the present disclosure adopts a systematically combined configuration of an adaptive forward lighting (AFL) function on/off check unit 110, a headlamp driving controller 120, etc. In this case, the headlamp driving controller 120 adopts a systematically combined configuration of a headlamp left/right driving control module 121, a headlamp up/down driving control module 122, a headlamp beam pattern change control module 123, etc.

In this instance, upon operation of a headlamp 70, the AFL function on/off check unit 110 communicates with a vehicle control system 52 and reads the driver's selection whether to turn on/off the AFL function, and then when the AFL function is selected as ON, communicates with the headlamp driving controller 120 and induces the operation control of a left/right driving actuator 60, an up/down driving actuator 61, a beam pattern changing actuator 62, etc. connected to the headlamp 70, and controls to enable, through this, automatic control of the up/down/left/right driving of the headlamp 70, beam pattern changes of the headlamp 70, etc. based on speed changes of the vehicle, angle changes of the steering, front/rear inclination changes of the vehicle, etc., thereby supporting the driver to normally enjoy a series of AFL functions without any particular problem on the driver's side.

In this case, when the AFL function is selected as ON, the AFL function on/off check unit 110 performs a series of message generation routines to generate an AFL function execution initiation message, and then transmits the generated AFL function execution initiation message to the headlamp driving controller 120, to induce the headlamp driving controller 120 to normally perform a procedure for controlling the left/right driving actuator 60, a procedure for controlling the up/down driving actuator 61, a procedure for controlling the beam pattern changing actuator 62, etc. necessary for the headlamp driving controller 120 without any particular problem.

Additionally, the headlamp driving controller 120 working together with the AFL function on/off check unit 110 communicates with a sensor 51 (e.g., a steering wheel angle sensor, a vehicle speed sensor, an accelerator pedal sensor, a brake sensor, a vehicle front end leveling sensor, a vehicle rear end leveling sensor, etc.) connected to various vehicle function modules 50 (e.g., a handle, an accelerator pedal, a vehicle left/right driving function element, a vehicle leveling function element, a shutter function element, etc.), and when the AFL function execution initiation message is transmitted from the AFL function on/off check unit 110, controls the operation of the left/right driving actuator 60, the up/down driving actuator 61, the beam pattern changing actuator 62, etc. connected to the headlamp 70 based on sensing values from the sensor 51, to support the automatic control of up/down/left/right driving of the headlamp 70, beam pattern changes of the headlamp 70, etc. based on speed changes of the vehicle, angle changes of the steering, front/rear inclination changes of the vehicle, etc.

In this instance, the headlamp left/right driving control module 121 belonging to the headlamp driving controller 120 communicates with the sensor 51 (e.g., a steering wheel angle sensor, a vehicle speed sensor, an accelerator pedal sensor, a brake sensor, a vehicle front end leveling sensor, a vehicle rear end leveling sensor, etc.) connected to the vehicle function module 50 (e.g., a handle, an accelerator pedal, a vehicle left/right driving function element, a vehicle leveling function element, a shutter function element, etc.), and when the AFL function execution initiation message is transmitted from the AFL function on/off check unit 110, controls the operation of the left/right driving actuator 60 connected to the headlamp 70 based on sensing values from the sensor 51, to support the automatic control of the left/right driving of the headlamp 70 based on speed changes of the vehicle, angle changes of the steering, front/rear inclination changes of the vehicle, etc.

Additionally, the headlamp up/down driving control module 122 belonging to the headlamp driving controller 120 communicates with the sensor 51 (e.g., a steering wheel angle sensor, a vehicle speed sensor, an accelerator pedal sensor, a brake sensor, a vehicle front end leveling sensor, a vehicle rear end leveling sensor, etc.) connected to the vehicle function module 50 (e.g., a handle, an accelerator pedal, a vehicle left/right driving function element, a vehicle leveling function element, a shutter function element, etc.), and when the AFL function execution initiation message is transmitted from the AFL function on/off check unit 110, controls the operation of the up/down driving actuator 61 connected to the headlamp 70 based on sensing values from the sensor 51, to support the automatic control of the up/down driving of the headlamp 70 based on speed changes of the vehicle, angle changes of the steering, front/rear inclination changes of the vehicle, etc.

Further, the headlamp beam pattern change control module 123 belonging to the headlamp driving controller 120 communicates with the sensor 51 (e.g., a steering wheel angle sensor, a vehicle speed sensor, an accelerator pedal sensor, a brake sensor, a vehicle front end leveling sensor, a vehicle rear end leveling sensor, etc.) connected to the vehicle function module 50 (e.g., a handle, an accelerator pedal, a vehicle left/right driving function element, a vehicle leveling function element, a shutter function element, etc.), and when the AFL function execution initiation message is transmitted from the AFL function on/off check unit 110, controls the operation of the beam pattern changing actuator 62 connected to the headlamp 70 based on sensing values from the sensor 51, to support the automatic control of the beam pattern changes of the headlamp 70 based on speed changes of the vehicle, angle changes of the steering, front/rear inclination changes of the vehicle, etc.

Meanwhile, even under this system of the present disclosure, the driver has a desire to execute the AFL function at high, medium, low, etc. outputs classified according to the driver's characteristics (e.g., age, driving attitude, gender, eyesight, etc.).

For example, a driver in mid-fifties has a desire that AFL function be implemented, but its level be middle in view of the driver's characteristic that is somewhat sensitive to a sharp change of the headlamp 70, and a driver with astigmatism has also a desire that AFL function be implemented, but its level be low in view of the drivers characteristic that is somewhat sensitive to a sharp change of the headlamp 70.

In this sensitive situation, as shown in FIG. 2, the present disclosure takes measures to additionally place an AFL function detailed adjustment controller 130 unique to the present disclosure under the communication infrastructure of the vehicle control system 52, the AFL function on/off check unit 110, the headlamp driving controller 120, etc.

In this case, the AFL function detailed adjustment controller 130 of the present disclosure performs a role in communicating with the vehicle control system 52, the AFL function on/off check unit 110, the headlamp driving controller 120, etc. and at the time of operation of the headlamp driving controller 120, reading pre-stored AFL function detailed setting particulars, and then communicating with the headlamp driving controller 120, and inducing the operation control of the left/right driving actuator 60, the up/down driving actuator 61, the beam pattern changing actuator 62, etc. on each AFL detailed level (e.g., upper level, middle level, lower level, etc.) classified according to AFL detailed distinction particulars preset in the AFL function detailed setting particulars.

Here, the AFL function detailed setting particulars may include, for example, setting particulars to execute the left/right driving of the headlamp on middle level, setting particulars to execute the up/down driving of the headlamp on lower level, setting particulars to execute the beam pattern change of the headlamp on middle level, etc.

In this instance, as shown in FIG. 3, the AFL function detailed adjustment controller 130 according to the present disclosure adopts a systematically combined configuration of an operation information storage module 132, an AFL function detailed setting support module 133, an AFL function detailed setting particulars storage module 134, an AFL function distinction execution support module 135, etc. that communicate with the sensor 51, the vehicle control system 52, the AFL function on/off check unit 110, the headlamp driving controller 120, the headlamp left/right driving control module 121, the headlamp up/down driving control module 122, the headlamp beam pattern change control module 123, etc. through the medium of an interface module 131.

In this case, the AFL function distinction execution support module 135 adopts a systematically combined configuration of a headlamp left/right driving distinction execution support module 136, a headlamp up/down driving distinction execution support module 137, a beam pattern change distinction execution support module 138, etc.

Here, the operation information storage module 132 performs a role in stably storing/managing various operation information for supporting selective distinction execution of the AFL function in its information storage area, for example, registration information of the sensor 51, registration information of the vehicle control system 52, registration information of the AFL function on/off check unit 110, registration information of the headlamp driving controller 120, registration information of the headlamp left/right driving control module 121, registration information of the headlamp up/down driving control module 122, registration information of the headlamp beam pattern change control module 123, registration information of a multimedia device set 80 (shown in FIG. 2), and program/component information and resource source information for performing the functions of each computation module, etc., to help to normally perform a series of vehicular headlamp driving control procedures according to the present disclosure without any particular problem.

In this instance, as shown in FIG. 2, the AFL function detailed setting support module 133 performs a role in communicating with the multimedia device set 80 controlled by the vehicle control system 52 through the medium of the interface module 131, and when the AFL function detailed setting particulars (e.g., setting particulars to execute the left/right driving of the headlamp on middle level, setting particulars to execute the up/down driving of the headlamp on lower level, setting particulars to execute the beam pattern change of the headlamp on middle level, etc.) are transmitted from the multimedia device set 80, receiving the corresponding AFL function detailed setting particulars, and then communicating with the AFL function detailed setting particulars storage module 134, and stably storing/managing the received AFL function detailed setting particulars in the information storage area of the AFL function detailed setting particulars storage module 134.

In this situation, as shown in FIG. 4, the driver may set the AFL function in detail, for example, to execute the left/right driving of the headlamp on the middle level, execute the up/down driving of the headlamp on the lower level and execute the beam pattern change of the headlamp on the middle level, etc. only by a very simple procedure of executing a series of AFL function detail setting guide menus 200 by computational manipulation of the multimedia device set 80, and then selecting displayed phrases, numbers, symbols, etc.

In this infrastructure-implemented situation, the AFL function distinction execution support module 135 performs a role in communicating with the AFL function on/off check unit 110, the headlamp driving controller 120, etc., at the time of operation of the headlamp driving controller 120, reading the pre-stored AFL function detailed setting particulars (e.g., setting particulars to execute the left/right driving of the headlamp on middle level, setting particulars to execute the up/down driving of the headlamp on lower level, setting particulars to execute the beam pattern change of the headlamp on middle level, etc.), and then communicating with the headlamp driving controller 120, and inducing the operation control of the left/right driving actuator 60, the up/down driving actuator 61 and the beam pattern changing actuator 62, etc. on each AFL detailed level (e.g., upper level, middle level, lower level, etc.) classified according to the AFL detailed distinction particulars preset in the AFL function detailed setting particulars.

In this instance, the headlamp left/right driving distinction execution support module 136 belonging to the AFL function distinction execution support module 135 performs a role in, at the time of operation of the headlamp driving controller 120, communicating with the AFL function on/off check unit 110, the AFL function detailed setting particulars storage module 134, etc., reading the AFL function execution initiation message and the AFL function detailed setting particulars (e.g., setting particulars to execute the left/right driving of the headlamp on middle level, etc.), and then transmitting the AFL detailed distinction particulars (e.g., particulars to execute the left/right driving of the headlamp on middle level, etc.) to the headlamp left/right driving control module 121 of the headlamp driving controller 120, to support the left/right driving actuator 60 controlled by the headlamp left/right driving control module 121 to drive the left/right movement of the headlamp 70 on an AFL detailed level (e.g., middle level) corresponding to the AFL detailed distinction particulars (e.g., particulars to execute the left/right driving of the headlamp on the middle level, etc.).

Under the function execution by the headlamp left/right driving distinction execution support module 136, for example, a driver in mid-fifties may enjoy an AFL function service (e.g., AFL function service in which left/right driving of the headlamp is executed on middle level) suitably reflecting the driver's characteristic that is somewhat sensitive to a sharp change of the headlamp 70 more effectively without extreme selection such as ON or OFF of the AFL function, etc.

As another example, a driver with astigmatism may also enjoy an AFL function service (e.g., AFL function service in which left/right driving of the headlamp is executed on lower level) suitably reflecting the driver's characteristic that is somewhat sensitive to a sharp change of the headlamp 70 more effectively without extreme selection such as ON or OFF of the AFL function, etc.

Meanwhile, the headlamp up/down driving distinction execution support module 137 belonging to the AFL function distinction execution support module 135 together with the headlamp left/right driving distinction execution support module 136 performs a role in, at the time of operation of the headlamp driving controller 120, communicating with the AFL function on/off check unit 110, the AFL function detailed setting particulars storage module 134, etc., reading the AFL function execution initiation message and the AFL function detailed setting particulars (e.g., setting particulars to execute the up/down driving of the headlamp on middle level, etc.), and then transmitting the AFL detailed distinction particulars (e.g., particulars to execute the up/down driving of the headlamp on middle level, etc.) to the headlamp up/down driving control module 122 of the headlamp driving controller 120, to support the up/down driving actuator 61 controlled by the headlamp up/down driving control module 122 to drive the up/down movement of the headlamp 70 on an AFL detailed level (e.g., middle level) corresponding to the AFL detailed distinction particulars (e.g., particulars to execute the up/down driving of the headlamp on middle level, etc.).

Under the function execution by the headlamp up/down driving distinction execution support module 137, for example, a driver in mid-fifties may enjoy an AFL function service (e.g., AFL function service in which up/down driving of the headlamp is executed on middle level) suitably reflecting the driver's characteristic that is somewhat sensitive to a sharp change of the headlamp 70 more effectively without extreme selection such as ON or OFF of the AFL function, etc.

As another example, a driver with astigmatism may also enjoy an AFL function service (e.g., AFL function service in which up/down driving of the headlamp is executed on lower level) suitably reflecting the driver's characteristic that is somewhat sensitive to a sharp change of the headlamp 70 more effectively without extreme selection such as ON or OFF of the AFL function, etc.

Meanwhile, the headlamp beam pattern change distinction execution support module 138 belonging to the AFL function distinction execution support module 135 together with the headlamp left/right driving distinction execution support module 136, the headlamp up/down driving distinction execution support module 137, etc. performs a role in, at the time of operation of the headlamp driving controller 120, communicating with the AFL function on/off check unit 110, the AFL function detailed setting particulars storage module 133, etc., reading the AFL function execution initiation message and the AFL function detailed setting particulars (e.g., setting particulars to execute the beam pattern change of the headlamp on middle level, etc.), and then transmitting the AFL detailed distinction particulars (e.g., particulars to execute the beam pattern change of the headlamp on middle level, etc.) to the headlamp beam pattern change control module 123 of the headlamp driving controller 120, to support the beam pattern changing actuator 62 controlled by the headlamp beam pattern change control module 123 to drive the beam pattern change of the headlamp 70 on an AFL detailed level (e.g., middle level) corresponding to the AFL detailed distinction particulars (e.g., particulars to execute the beam pattern change of the headlamp on middle level, etc.).

Under the function execution of the headlamp beam pattern change distinction execution support module 138, for example, a driver in mid-fifties may enjoy an AFL function service (e.g., AFL function service in which beam pattern change of the headlamp is executed on middle level) suitably reflecting the driver's characteristic that is somewhat sensitive to a sharp change of the headlamp 70 more effectively without extreme selection such as ON or OFF of the AFL function, etc.

As another example, a driver with astigmatism may also enjoy an AFL function service (e.g., AFL function service in which beam pattern change of the headlamp is executed on lower level) suitably reflecting the driver's characteristic that is somewhat sensitive to a sharp change of the headlamp 70 more effectively without extreme selection such as ON or OFF of the AFL function, etc.

As above, under the communication infrastructure of the vehicle control system 52, the AFL function on/off check unit 110 and the headlamp driving controller 120, etc., since the present disclosure additionally places a computation module to, at the time of operation of the headlamp driving controller 120, read the pre-stored AFL function detailed setting particulars (e.g., setting particulars to execute the left/right driving of the headlamp on middle level, setting particulars to execute the up/down driving of the headlamp on lower level, setting particulars to execute the beam pattern change of the headlamp on middle level, etc.), and then communicate with the headlamp driving controller 120, and support the operation control of the left/right driving actuator, the up/down driving actuator, the beam pattern changing actuator, etc. on each AFL detailed level (e.g., upper level, middle level, lower level, etc.) classified according to the AFL detailed distinction particulars preset in the AFL function detailed setting particulars, and in the implementation environment of the present disclosure, the driver may execute the AFL function at high, medium, low, etc. outputs (i.e., upper level, middle level, lower level, etc.) classified according to the driver's characteristics (e.g., age, driving attitude, gender, eyesight, etc.), and eventually, the driver and the vehicle supplier may enjoy vehicle performance improvement benefits from further details of the AFL function more effectively.

The present disclosure is not limited to a particular field, and exerts the overall useful effect in many fields requiring efficient use of electricity.

Additionally, although the particular embodiment of the present disclosure has been hereinabove described and illustrated, it is obvious that the present disclosure may be variously modified and embodied by those skilled in the art.

The modified embodiments should not be understood separately from the technical spirit or perspective of the present disclosure, and it should be noted that the modified embodiments fall in the scope of the appended claims of the present disclosure.

There is provided the vehicular headlamp driving control device, under the communication infrastructure of the vehicle control system, the AFL function on/off check unit, the headlamp driving controller, etc., additionally provided with the computation module, at the time of operation of the headlamp driving controller, to read the pre-stored AFL function detailed setting particulars, and then communicate with the headlamp driving controller, and support the operation control of the left/right driving actuator, the up/down driving actuator, the beam pattern changing actuator, etc. on each AFL detailed level classified according to the AFL detailed distinction particulars preset in the AFL function detailed setting particulars. Additionally, there is provided the vehicular headlamp driving control device that allows the driver to execute the AFL function at high, medium, low, etc. outputs classified according to the driver's characteristics.

The invention claimed is:

1. A vehicular headlamp driving control device, comprising:
   an adaptive forward lighting (AFL) function on/off check unit that upon operation of a headlamp, communicates with a vehicle control system and reads a selection whether to turn on/off an AFL function, and when the AFL function is selected as ON, generates an AFL function execution initiation message;
   a headlamp driving controller that while communicating with a sensor connected to a vehicle function module and the AFL function on/off check unit, reads the AFL function execution initiation message, and then controls operation of a left/right driving actuator, an up/down driving actuator and a beam pattern changing actuator connected to the headlamp so as to correspond to a sensing value from the sensor; and
   an AFL function detailed adjustment controller that at the time of operation of the headlamp driving controller, reads pre-stored AFL function detailed setting particulars, and then communicates with the headlamp driving controller, and controls the operation of the left/right driving actuator, the up/down driving actuator and the beam pattern changing actuator on an AFL detailed level of an upper level, a middle level, or a lower level classified according to AFL detailed distinction particulars preset in the AFL function detailed setting particulars.

2. The vehicular headlamp driving control device according to claim 1, wherein the AFL function detailed adjustment controller comprises:
   an AFL function detailed setting particulars storage module that stores the AFL function detailed setting particulars;
   a headlamp left/right driving distinction execution support module that at the time of operation of the headlamp driving controller, communicates with the AFL function on/off check unit and the AFL function detailed setting particulars storage module, reads the AFL function execution initiation message and the AFL function detailed setting particulars, and then transmits the AFL detailed distinction particulars to the headlamp driving controller to allow the left/right driving actuator to drive a left/right movement of the headlamp on an AFL detailed level of an upper level, a middle level, or a lower level corresponding to the AFL detailed distinction particulars;
   a headlamp up/down driving distinction execution support module that at the time of operation of the headlamp driving controller, communicates with the AFL function on/off check unit and the AFL function detailed setting particulars storage module, reads the AFL function execution initiation message and the AFL function detailed setting particulars, and then transmits the AFL detailed distinction particulars to the headlamp driving controller to allow the up/down driving actuator to drive an up/down movement of the headlamp on an AFL detailed level of an upper level, a middle level, or a lower level corresponding to the AFL detailed distinction particulars; and
   a headlamp beam pattern change distinction execution support module that at the time of operation of the headlamp driving controller, communicates with the AFL function on/off check unit and the AFL function detailed setting particulars storage module, reads the AFL function execution initiation message and the AFL function detailed setting particulars, and then transmits the AFL detailed distinction particulars to the headlamp driving controller to allow the beam pattern changing actuator to change a beam pattern of the headlamp on an AFL detailed level of an upper level, a middle level, or a lower level corresponding to the AFL detailed distinction particulars.

3. The vehicular headlamp driving control device according to claim 2, wherein the AFL function detailed adjustment controller further comprises:
   an AFL function detailed setting support module that communicates with a multimedia device set controlled by the vehicle control system, when AFL function detailed setting particulars are transmitted from the multimedia device set, receives the corresponding AFL function detailed setting particulars, and then communicates with the AFL function detailed setting particulars storage module, and stores the received AFL function detailed setting particulars in the AFL function detailed setting particulars storage module.

* * * * *